United States Patent [19]
Storn

[11] Patent Number: 5,396,470
[45] Date of Patent: Mar. 7, 1995

[54] MONOLITHICALLY INTEGRATED DATA MEMORY ARRANGEMENT AND METHOD FOR THE OPERATION THEREOF

[75] Inventor: Rainer Storn, Kirchheim, Germany

[73] Assignee: Siemens Aktiengesellschaft, Munich, Germany

[21] Appl. No.: 185,243

[22] Filed: Jan. 24, 1994

[30] Foreign Application Priority Data

Feb. 1, 1993 [DE] Germany ............... 43 02 754.7

[51] Int. Cl.⁶ .................................. G11C 13/00
[52] U.S. Cl. .................. 365/230.01; 365/189.09; 365/230.06
[58] Field of Search .......... 365/189.01, 230.01, 365/189.02, 189.04, 189.09, 230.06

[56] References Cited

U.S. PATENT DOCUMENTS 4,841,487  6/1989  Demura et al.

OTHER PUBLICATIONS

"Datenstrukturen und Datenorganisationen", Ollmert, H. J., Oldenbourg, 1989, pp. 133–162.

*Primary Examiner*—Terrell W. Fears
*Attorney, Agent, or Firm*—Hill, Steadman & Simpson

[57] ABSTRACT

In a memory arrangement and operating method therefor which enables an accelerated table search, an address generator, which operates according to a hash method, and an addressable memory are, integrated on a chip. A further advantage is achieved when the address generator is programmable, so that the hash method can be variably prescribed. A further acceleration is achieved when a CRC method is utilized for the calculation of the hash addresses and when intermediate results of the polynomial division are stored in tables. Two advantages are thus exploited. One advantage is an increase in speed due to the integration, and the further advantage is an increase in speed due to the accelerated polynomial division, as well as the high access hit rates inherent in the hash method.

5 Claims, 7 Drawing Sheets

MONOLITHICALLY INTEGRATED DATA MEMORY ARRANGEMENT AND METHOD FOR THE OPERATION THEREOF

BACKGROUND OF THE INVENTION

Accesses to data linked to one another are often required in data processing applications. Due to operating requirements of the data processing means, such data can be stored at various locations in the memory of the data processing system. One reason for the separate storing is due to the amount of data to be stored. Frequent access to a large set of data at a fixed memory location would slow down the operation of the data processing system. Another reason is that different data sets must be accessed in parallel and that a constant connection of these data sets would also have a disadvantageous effect on the speed of the data processing.

Such linked data is often a matter of tables or lists that reference one another. Such linked data or lists are often used in communications technology and in the field of artificial intelligence. Fast access to data linked to one another means a high data processing speed precisely in these areas. The terms "key" and "associated information" have also become established in the field of communications technology for data linked to one another that hierarchically build on one another.

A few examples of such keys and information associated therewith follow.

First Example

Key: name of person
Associated information: address, date of birth, telephone number,

Second Example

Key: sending address in a computer network
Associated information: number of the appertaining table wherein all permitted reception addresses reside.

Third Example

Key: E.164 address declared according to CCITT
Associated information: network type of the computer network belonging to the E.164 address, allowed addresses to which transmission from the current E.164 address is allowed to be carried out, permitted addresses of those allowed to receive current E.164 address data packets, etc.

There are various hardware and software solutions for locating information that are associated with keys. The software solutions are based on fast search methods (binary search, hash method, Ollmert, H. J. Datenstrukturen und Datenorganisationen, Oldenbourg, 1989, pp. 133-162). The example of a hardware solution is currently what is referred to as associative memory or CAM (CAM=Content Addressability Memory).

The exact functioning and the structure of the associative memory are disclosed in Hilberg, W., "Digitale Speicher 1", Oldenbourg, 1987. The basic idea is based on seeking the key to be sought in every individual memory word of the CAM and comparing it. All those memory words that contain keys at the matching position are marked by what are referred to as detector elements having the content "1" (hit). Such a fully associative memory has the disadvantage that the individual memory cells are extremely complicated due to the built-in comparator circuit and are thus comparatively large, and that the plurality of pins to be conducted out for an integrated circuit is high Hilberg, W., "Digitale Speicher 1", Oldenbourg, 1987. This results in the fact that the plurality of memory elements in commercially available CAMs is still relatively slight (for example, 1024 32-bit words), this not doing justice to the trend to increasingly larger tables, particularly in communications technology (caused by more and more extensive communication networks and performance features).

A certain alleviation with respect to the number of storage locations can be achieved on the basis of what is referred to as partially associative memories, wherein the comparison of the key no longer occurs parallel in every memory word but is serialized Hilberg, W., "Digitale Speicher 1" Oldenbourg, 1987. Having to , equip each memory cell with a comparator circuit can be avoided in this way, the chip size being clearly reduced as a result thereof.

Even given partially associative memories based on traditional technology, however, the search strategy is based on comparing the corresponding partial content of each and every memory word to the search key in order to find the associated information. This leads to relatively long search times in the partially associative memory.

In many applications, specifically in most table searches that are required within the framework of communications applications, the case does not occur that a plurality of hits can be present for one key. It is far more important in this context that an optimally large plurality of memory cells can be addressed with one search. For this reason, the classic (partially) associative memory is not adapted to this task. Nonetheless, fastest table accesses are becoming more and more important, specifically in communications technology with its trend toward gigabit and terabit processing.

SUMMARY OF THE INVENTION

It is an object of the present invention to provide a data memory arrangement and a method for the operation thereof with which accesses to associated data ensuing via keys is accelerated.

In general terms the present invention is a monolithically integrated data memory arrangement, whereby at least one addressable main memory area for the acceptance of data to be stored is provided in at least one memory, and whereby at least one address generator is provided which generates at least one address for addressing the main memory area from data to be stored, producing the at least one address by applying a hash function onto at least a part of the data to be stored. In a method of the present invention for operating the data memory arrangement, a polynomial division on the basis of a generator polynomial, what is referred to as a CRC calculation, is applied as the has method. At least one previously stored intermediate result of polynomial divisions is employed in the calculation of the polynomial division for shortening the calculating time.

A particular advantage of the arrangement of the present invention is that the internal address and databus word widths is freely selectable. As a result thereof, an extremely efficient data access is enabled. It can also be beneficial in this context to make the address generator freely programmable, so that a different hash function can be set for the address generating as needed.

It can also be advantageous to provide a data gate logic that, dependent on a control signal, controls write and read events from the memory or into the memory. It is possible to keep memory contents available for a comparison to data pending at the bus with the buffer memory within this data gate logic.

It can also be advantageous to provide a status logic which sorts the key information from an incoming data stream with the assistance of a control signal and keeps it ready in a memory.

It is also beneficial to implement the collision handling in the status logic since the incoming data are intermediately stored there. An easy comparison is thus possible. Following thereupon, a new key can simply be calculated according to a known overflow method such as described, for example, in Ollmert, H. J. Datenstrukturen und Datenorganisationen, Oldenbourg, 1989, pp. 133-162.

A method for the operation of the data memory arrangement is especially beneficial which implements a polynomial division on the basis of a generator polynomial as hash method. These methods are known as cyclic redundancy check (CRC) calculating methods (see Ramabadran, T. V. and Gaitonde S. S., "A Tutorial on CRC Computations" IEEE Micro, August 1988, pp. 62-71. They are employed, for example, in the allocation of errors to error signatures in the testing field and assure a high hit rate in combination with few collisions.

Given the application of this method of polynomial divisions, it is especially beneficial to intermediately store specific results, since the calculating process can be further accelerated in this way and the set of intermediate results is surveyable.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
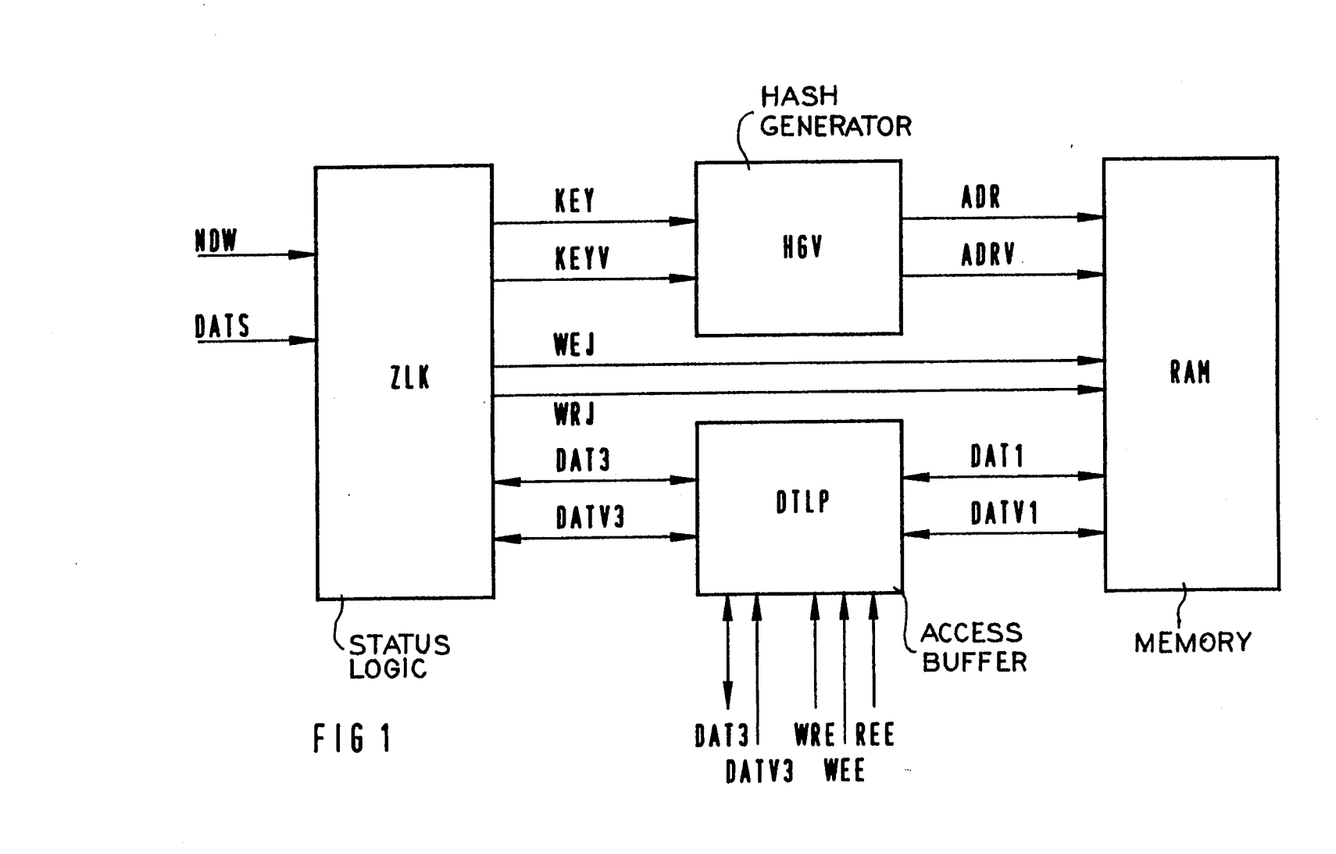
FIG. 1 shows an example of a memory arrangement of the present invention.
Figure 2:
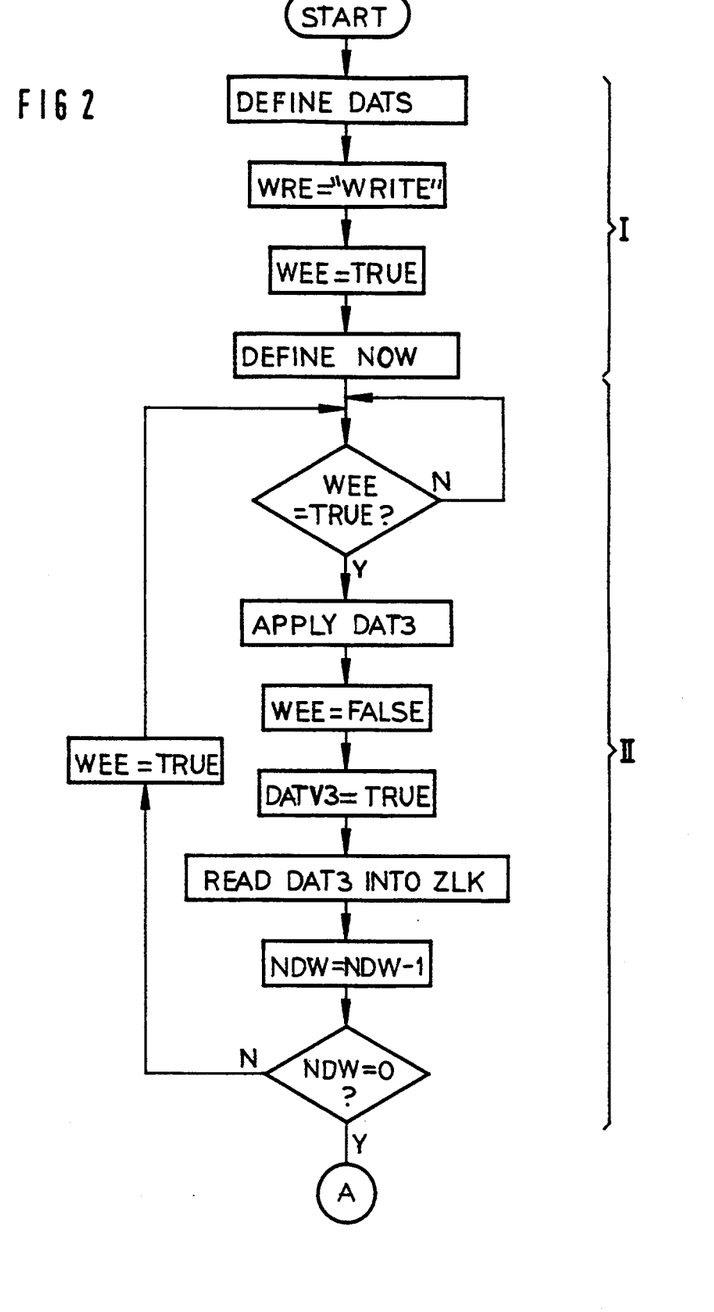
FIGS. 2-4 depict a flowchart of an exemplary operating method of a memory arrangement of the present invention for the write operation.

FIG. 1 shows an exemplary memory arrangement as provided by the present invention. It is composed of a data gate logic having access buffer DTLP, of a status logic having collision resolution ZLK, of a hash generator HGV and of a memory having an addressable read memory area RAM. The individual signals via which the various component parts of the arrangement communicate with one another or via which they are supplied with data are also shown.

Signals DATV3, WRE, WEE and REE are supplied to the data gate logic with access buffer via a databus DAT3. The data to be stored is applied to the data gate logic with access buffer via a databus DAT3. It is indicated with DATV3 that data is pending and a switch from read mode into write mode is undertaken via WRE. External read or write is enabled with REE or WEE, respectively. The data pending at the data gate logic with buffer memory DTLP is looped through to the status logic with collision resolution via DAT3 or DATV3 and is intermediately stored thereat. The signals NDW and DATS that are supplied to ZLK control what component part of the incoming data word contains the key with DATS. The signal NDW controls the plurality of data words that are to be stored per memory unit. In case ZLK identified a key in the incoming data via DATS and NDW, then it is applied to the hash generator HGV via key and it is indicated via key valid "KEYV" that the key data can now be fetched. The hash generator HGV now calculates an address from the key and applies this address to the memory via ADR. With address valid ADRV, it shows the memory RAM that the address is now valid. Via WRI, the memory RAM is now switched to read mode and the content that resides in the memory under the applied address is read with the data line DAT1 and DATV1 into the status logic with collision handling by the data gate logic with buffer memory DTLP via, further, DAT3 and DATV3. The status logic with collision handling now checks whether the data that has been read out from the memory is identified as empty, erased or busy.

When the data is identified as busy, it calculates a new key on the basis of a known overflow method. When the memory is identified as erased or empty, it initiates via WEI and WRI that the memory is switched to write mode and writing and the word that arrives from the outside or a plurality of words as well are deposited in the memory under the corresponding address via DAT3, DATV3 and DAT1 and DATV1 in combination with the data gate logic and buffer. DATV1 and DATV3 signal not only the validity of the data but also respectively indicate the direction of the data flow for DTLP. A check can be carried out in ZLK when reading out from RAM to see whether the pending key is stored under the address to be read out. When this is the case, then the addressed data from ZLK can be applied to the bus DAT3 via DTLP. When this is not the case, then a collision handling must be carried out. The read and write mode shall be set forth in greater detail in the following Figures.

FIGS. 2-5 show an operating method for write-in into a memory arrangement of the invention. The operating method is shown in the form of a flowchart. The combined regions I, II, III and IV identify different sections in the method. I references the initialization procedure; II references the read-in event into the status logic with collision resolution. III references the validation process and IV references the actual write-in event.

DATS is first determined upon initialization I. In what data words of the incoming data stream the key is located and at what position it is located are therewith indicated. Subsequently, the external read-write signal WRE is switched to write and write enable external WRE is set to "true". It is then still necessary to prescribe the plurality of data words NDW that are to be read in per each event.

In section II, the data incoming on DAT3 are read into the status logic with collision handling. First, a check is carried out to determine if the external write enable WEE is set. Subsequently, data incoming via the databus DAT3 is applied and the external write enable WEE is set to "false" in order to prevent a further write-in. Subsequently, the status logic with collision handling ZLK is informed that the data is now available, i.e., DATV3 is set to "true". DAT3 is now read into the ZLK, namely until MDW is equal to zero or as long as NDW is equal to zero.

Figure 3:
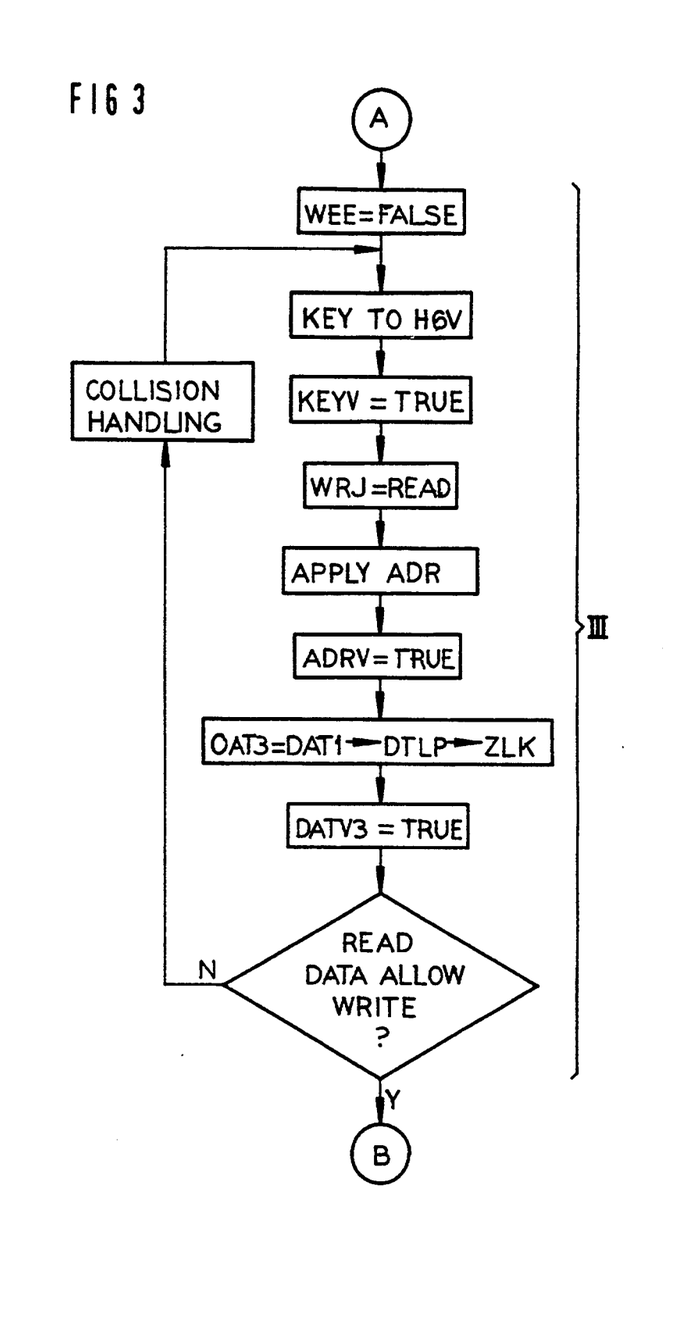
Figure 4:
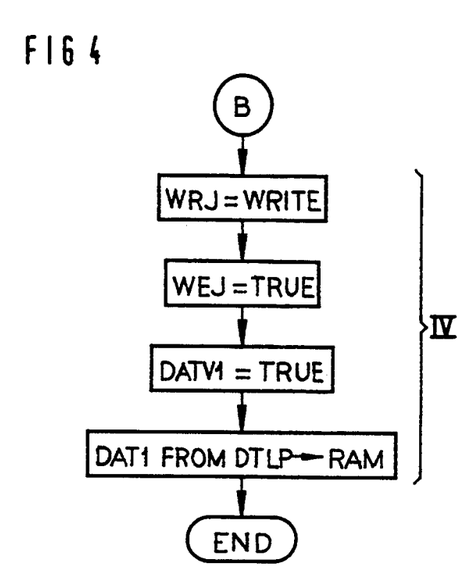

In Section III of FIG. 3, the key is calculated from the data pending at the status logic with collision handling ZLK and is applied to the hash unit HGV. Further, as already set forth in FIG. 1, a check is carried out to see what status the memory content residing under the address has, whether the memory can be written into, whether it is erased, or whether the data are protected. When the data is protected, a collision handling is implemented. When they are not protected, section IV follows and, as shown in the Figure, writing into the main memory area RAM is implemented.

Figure 5:
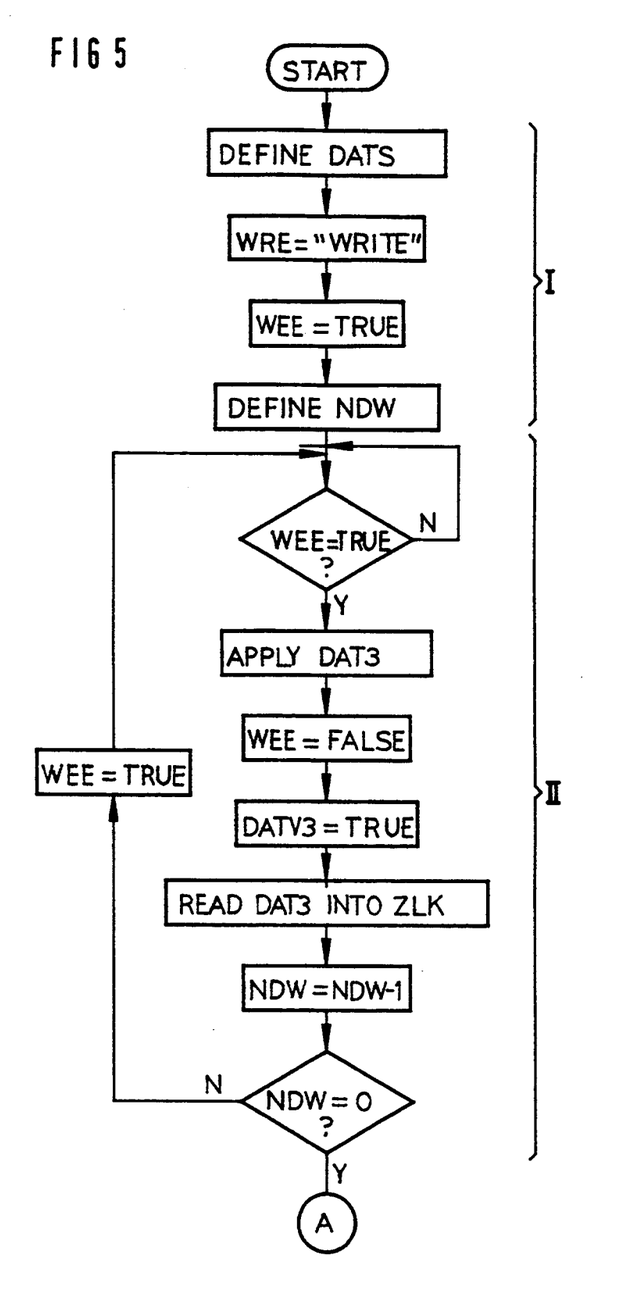
FIGS. 5-7 depict a flowchart of an exemplary operating method of a memory arrangement of the present invention for the read operation.
Figure 6:
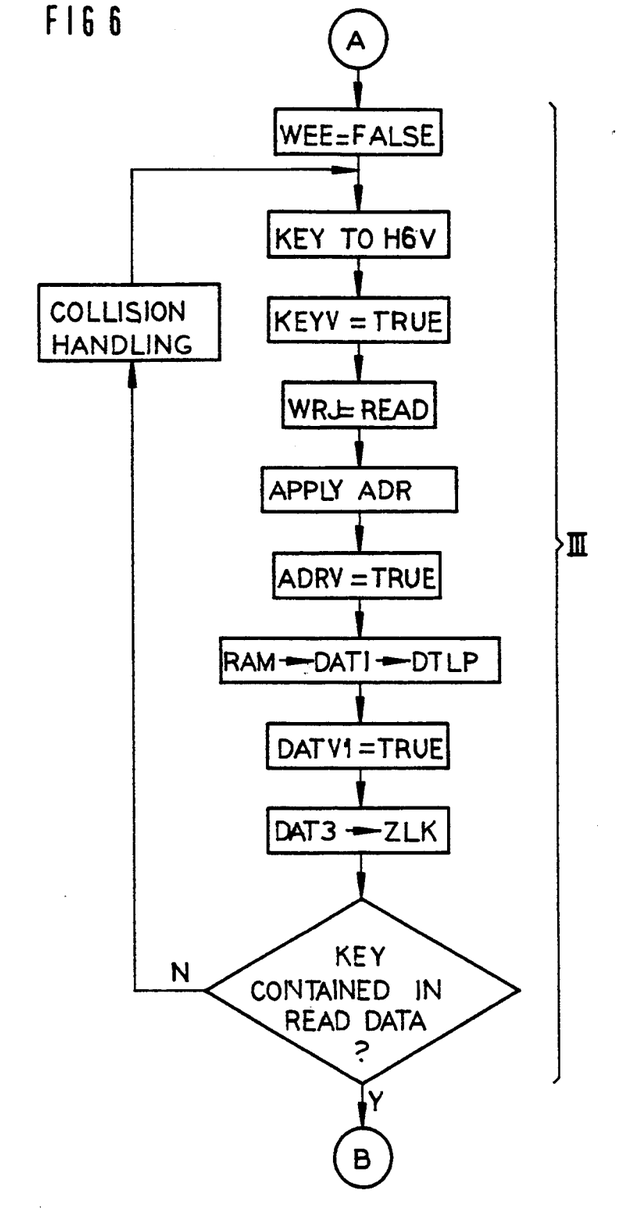
Figure 7:
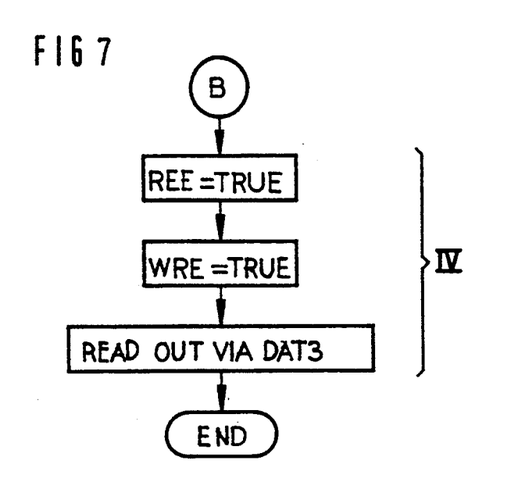

An exemplary operating method for the read process of the memory arrangement of the present invention is shown in FIGS. 5–7. It differs from the write-in process only on the basis of the regions identified as III and IV. It should essentially be pointed out that the data read out from the memory RAM is now checked to determine if it contains the key KEY. If the data contains the key, section IV follows and the data is read out. If the data does not contain the key, a collision handling follows.

The invention is not limited to the particular details of the apparatus and method depicted and other modifications and applications are contemplated. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. Method for operating a monolithically integrated data memory arrangement, comprising the steps of:

providing at least one addressable main memory area for acceptance of data to be stored in at least one memory;

providing at least one address generator which generates at least one address for addressing the main memory area from data to be stored, and producing said at least one address by applying a hash function onto at least a part of the data to be stored; and using a polynomial division on the basis of a generator polynomial, as said hash function.

2. The method according to claim 1, wherein the arrangement further comprises using at least one previously stored intermediate result of polynomial divisions in the calculation of the polynomial division for shortening a calculating time thereof.

3. The method according to claim 1, wherein said hash function is a cyclic redundancy check calculation.

4. A monolithically integrated data memory arrangement, comprising:

at least one addressable main memory area for acceptance of data to be stored in at least one memory;

at least one address generator which generates at least one address for addressing the main memory area from data to be stored, said at least one address generator producing said at least one address by applying a hash function onto at least a part of the data to be stored;

at least one data gate logic which, dependent on at least one control signal, controls access onto the memory in write and read events in that said at least one data gate logic either reads in data pending at a bus or reads out data pending at the memory; and at least one status logic which, dependent on at least one further control signal, controls a data word length to be handled by said at least one data gate logic.

5. The data memory arrangement according to claim 4, wherein a new address is generated by said at least one status logic given an address collision, being generated in that an overflow method is applied.

* * * * *